United States Patent [19]

Hannig et al.

[11] 4,359,607

[45] Nov. 16, 1982

[54] TELEPHONE ANSWERING APPARATUS WITH SOLID STATE AND DYNAMIC TAPE STORAGE

[75] Inventors: Hubert Hannig, Marburg; Karl H. Krapp, Wehrda; Heinz Mölleken, Schwalmstadt, all of Fed. Rep. of Germany

[73] Assignee: Deutsche Fernsprecher Gesellschaft mbH Marburg, Fed. Rep. of Germany

[21] Appl. No.: 102,897

[22] Filed: Dec. 12, 1979

[30] Foreign Application Priority Data

Dec. 16, 1978 [DE] Fed. Rep. of Germany ....... 2854401
Dec. 16, 1978 [DE] Fed. Rep. of Germany ....... 2854431
Dec. 16, 1978 [DE] Fed. Rep. of Germany ....... 2854516
Sep. 5, 1979 [DE] Fed. Rep. of Germany ....... 2935799

[51] Int. Cl.³ ............................................. H04M 1/64
[52] U.S. Cl. .............................. 179/6.03; 179/1 SM; 369/14; 365/228
[58] Field of Search ............... 179/1 SM, 100, 1 C, 179/6 R, 6.03, 6.17; 360/12, 31, 32; 365/228, 239, 233; 340/692, 675, 660; 369/14, 30, 53

[56] References Cited

U.S. PATENT DOCUMENTS

| 2,886,640 | 5/1959 | Van Deventer et al. | 179/6 R |
| 3,051,795 | 8/1962 | Roberts | 340/675 |
| 3,586,779 | 6/1971 | Chernack | 179/6 R |
| 3,810,116 | 5/1974 | Prohofsky | 365/228 |
| 3,914,551 | 10/1975 | Hunt | 179/6 R |
| 4,011,586 | 3/1977 | Pastor | 360/31 |
| 4,125,865 | 11/1978 | Mohammadioun | 360/32 |
| 4,150,255 | 4/1979 | Theis | 179/6 C |
| 4,194,196 | 3/1980 | Mohiuddin | 340/692 |

FOREIGN PATENT DOCUMENTS 1525437 9/1978 Fed. Rep. of Germany .

OTHER PUBLICATIONS

1977 Electro Conference Record, "Magnetic Bubble Memory In Telephone Systems", J. E. Williams, Apr. 1977, pp. 1-9.
Computer, "Electronically-Synthesized Voice Produced With Natural Qualities", vol. 6, No. 10, Oct. 1973, p. 39.

Primary Examiner—Bernard Konick
Assistant Examiner—Alan Faber
Attorney, Agent, or Firm—Wood, Herron & Evans

[57] ABSTRACT

A telephone has a built-in answering device comprising an outgoing message store and a control system programmable by pushbuttons for controlling the operational condition and sequence of the answering device. The advantages are compactness and ease of operation.

19 Claims, 5 Drawing Figures

TELEPHONE ANSWERING APPARATUS WITH SOLID STATE AND DYNAMIC TAPE STORAGE

FIELD OF THE INVENTION

The present invention relates to a telephone apparatus having a housing containing a dialing device, a station circuit and a handset including a microphone and a receiver associated with the station circuit. Either a rotary dial mechanism or a pushbutton mechanism may be employed as the dialing device, the pushbutton mechanism operating by the pulse dialing system or the touch tone system.

DESCRIPTION OF THE PRIOR ART

In order to be able to give a message to callers when absent or to record incoming speech, a multiplicity of answering machines have been offered as accessories for telephones, either as answering machines without speech recordal, as answering machines with speech recordal and with fixed or variable recordal periods or as answering machines permitting remote interrogation of the recording and also with remote erasure. These prior apparatuses are accessories with different modes of functioning. The modes of operation of the various apparatuses are therefore correspondingly different and, in general, require considerable effort when the apparatuses are put into operation and also during learning of the modes of operation. Furthermore, such apparatuses can be operated only in association with special telephone apparatus having the plug connections required for the answering machines. In addition to requiring a relatively large space, the relatively complicated operation is particularly disadvantageous, which in part is necessitated by the fact that the transmission of an outgoing message and the recordal of an incoming message each takes place in a completely separate apparatus.

OBJECT OF THE INVENTION

In contrast thereto, it is an object of the invention to provide a telephone apparatus which also performs the functions of an answering machine, is of compact construction and is particularly simple and clear to operate.

SUMMARY OF THE INVENTION

According to the invention there is provided a telephone apparatus, comprising: a housing provided with a dialing device and a station circuit; a handset provided with a microphone and a receiver associated with the station circuit; and an answering device integrally arranged in the housing; the answering device comprising first store means for storing an outgoing message; control means for selection and control of the operational state and the operational sequence of the answering device; pushbutton means on the housing for programming said control means; and reception and reproduction channel means for connecting the first store means to receive and transmit the outgoing message.

The advantages of the invention lie, in particular, in that the apparatus according to the invention includes all the devices that are required, on reception of a call, for reproduction of the outgoing message previously recorded in the first store means through the reception and reproduction channel means, contained in the telephone apparatus. For audible monitoring or audible reproduction of the outgoing message, it is transmitted over the reproduction channel means. By the incorporation of the answering device in the housing, the space requirement is considerably reduced in comparison with the known combination of a separate telephone and an answering machine, the operability is simplified, the functional clarity of the arrangement of the operating elements is increased and furthermore the functional safety when in use for answering is increased, since there are no longer any connecting plugs between two separate devices.

According to a particularly preferred embodiment of the invention, the first store means, contained within the housing of the telephone apparatus, is a solid state store having an input connected to an analog-to-digital converter for conversion of the electrical analog speech signals into digital speech signals and an output connected to a digital-to-analog converter for reconversion of the stored digital speech signals into analog speech signals. The telephone apparatus thus contains no movable parts for answering, i.e. no magnetic tape cassette and no drive mechanism, and is free of abrasion between a magnetic tape and a magnetic head. Furthermore, no special control and monitoring circuits for tape wear and blockage of a drive mechanism are required.

In order to reduce the storage capacity required for digital storage of the speech signal in a solid state store, a Delta modulation system is preferably employed for analog-to-digital conversion of the speech signals, in which, instead of the respective total magnitudes of the amplitude values to be digitized, only the variation of the amplitude values detected therefrom with respect to the previously detected amplitude values is evaluated. It has been found that with this method, and with a data rate of less than 12,000 bits per second, good speech quality can be obtained and reproduced. The digital-to-analog converter at the output of the first store then includes a Delta demodulator for demodulating the digital speech signals in accordance with the modulation system employed.

In a first state of adjustment, the control circuit couples the output of the first store to the telephone wires and, on reception of a call, transmits the message to the telephone wires. In a second state, which can be set by the user, the control circuit connects the input for recordal of the message to the reception channel means and in a selectable third state the control circuit connects the output of the first store for reproduction of the message to the reproduction channel means. There is also provided a rest position, in which the output and the input of the first store are disconnected from the station circuit.

To ensure satisfactory functioning of the telephone operation in a telephone apparatus embodying the invention, the making of outgoing and incoming telephone connections should not be hindered by the first store means or the control circuit means or any other additional devices. For this purpose, the control circuit in the rest condition, i.e. before reception of a call, automatically changes over from the second or third state to the rest state, from which the control circuit again changes over to the first state on reception of a call and thereby couples the first store means to the telephone wires.

A single coherent outgoing message is required for call answering without incoming speech recordal, while for call answering with incoming speech recordal firstly an introduction of predetermined type and duration is required. Then after a three second storage period for recordal of incoming speech a concluding message of predetermined type and duration is coupled to the telephone wires. For the case in which, for an answering machine with incoming speech recordal, the second store is for any reason not ready for recordal, a third response of predetermined type and duration should be fed to the telephone wires.

The present answering device may selectably be provided with or without the possibility of incoming speech recordal. If incoming speech recordal is possible, then the introduction, the concluding message and the response are stored in the first store as separate message sections. For operation without incoming speech recordal, on the other hand, only the coherent message is stored.

The first store means may therefore selectively be divided either into a plurality of storage zones, and more particularly into an introduction zone, a concluding message zone and a response zone, or the first store means may comprise only one message zone. The individual storage zones for recordal and reproduction of the outgoing message sections are preferably addressable directly—without any search periods—through the reception channel means and the reproduction channel means. This provides a substantial advantage over the state of the art, since with the magnetic tape stores previously used exclusively in answering machines, before the recordal of a message section in a particular storage zone, the magnetic tape must firstly be brought into a position corresponding to the storage zone by fast forward or rearward winding.

The storage locations of the individual zones of the first store means are addressed, for reception and reproduction of the message sections, serially and synchronously from a counter supplied with constant timing pulses. The control circuit means preferably controls the operation in such a way that any reception of a message section in any selected zone of the first store means is then immediately followed by reproduction through the reproduction channel means, so that the user can automatically acoustically monitor the recorded message without effecting further operational measures. In this way, the operability of the telephone apparatus with its integral answering device is substantially simplified.

An optical indicator device is preferably visibly arranged in the housing and responds to reception and/or reproduction of message sections and continuously indicates, on reception and/or reproduction, the addressed portion of the relevant selected zone of the first store means. During reception, the instantaneous relative occupation level of this store zone is thus optically indicated. During reproduction, it is thus indicated which relative portion of the message section contained in the relevant store zone has just been reproduced. The indicator device preferably comprises a plurality of discrete indicator elements, disposed in a row, which are controlled and illuminated simultaneously with the addressing of the stored zone of the first store means.

Such an optical indicator device represents, in particular, for the reception procedure, an effective means for providing the user with substantial assistance during recordal of the message sections, since it provides the user with a definite indication of the total time interval which is available, and of the consequential speech speed, within which or at which the relevant message section must be recorded in the relevant store zone. The previously usual use of a stop watch during recordal of the above-described short message sections can therefore be dispensed with, since the user is given, in a simple manner, a clear optical indication of the increasing occupation of the available store zones. The operability is thereby substantially simplified and the certainty that the message sections are spoken at the correct speed, and thereby fully recorded, is substantially increased.

The present telephone apparatus may have second store means for recordal of speech incoming from a caller. The control program of the control circuit means is so arranged, in this embodiment of the invention, that on reception of a call, firstly the message zone of the first store means emits the introduction to the telephone wires. Then, the input of the second store, which is preferably a magnetic tape store, is connected to the telephone wires for reception of the caller's message. After a predetermined time, the concluding message zone of the first store is again connected to the telephone wires in order to transmit the concluding message to the caller and finally the exchange loop is disconnected.

In an additional state of adjustment, the output of the second store can be connected to the reproduction channel means and the received message can be acoustically reproduced.

As already mentioned, the second store means is preferably a magnetic tape store. The first store means is preferably a transient solid state store. To ensure that the content of the transient store is also available even after a power failure, the outgoing message is preferably also simultaneously stored in the magnetic tape store on recordal in the first store means. The control circuit means, by means of a special power failure program, then transfers the outgoing message, on restoration of the supply voltage after a supply interruption, from the magnetic tape store into the first store means. Instead of a power failure program, a power failure control circuit incorporated in hardware may be provided, which also stores the message, during its reception, in the magnetic tape store and transfers it back into the first store means after a power failure. In this way it is ensured that the message is not transiently stored in the telephone apparatus and does not have to be rerecorded after a power failure, but can be transferred from the magnetic tape store to the transient solid state store.

The control circuit means preferably comprises first control means for controlling the operation when the answering device is set to a "call ready" operational condition and a second control means for controlling the answering device when the answering device is in a "reception/reproduction" operational condition. By means of a mode selector key, one or the other operational condition can be set by the user of the telephone apparatus. Instead of two hardware control units for controlling the operation during these operational conditions, the control circuit means may be provided with a microprocessor, containing a plurality of program sections, which controls the answering device on selection of the "call ready" or "reception/reproduction" operational condition through the operating cycle.

Preferably, an additional test store is connected to the output of a counter addressed to the first store means, which test store contains store elements respectively corresponding to the zone of the first store means. The store elements each change from an unset condition to a set condition after the respective store zone has been fully addressed during a reception procedure. The state of the store elements is therefore an indication of whether the previously performed reception procedure has or has not resulted in a complete occupation of the relevant store zone. By means of a test key, the condition of each of the store elements of the test store can be optically indicated. The user is thereby informed, without time consuming and troublesome reproduction of the message sections, whether the reception procedures have been inadvertently interrupted too early. Only when all storage elements are set is it possible that the message sections have been correctly recorded.

The state of the store elements of the test store is preferably optically indicated, on actuation of a test key, by illumination or non-illumination of selected photo-diodes in the indicator device.

In addition, on selection of the "call ready" operational condition, all zones of the first store means are addressed and the content of the sequentially addressed store locations, i.e. the electrical analog speech signals of the individual message sections, are fed through a level discriminator, which provides an alarm for a predetermined time interval when a predetermined level is not reached. The relevant message section then has an impermissibly long speech pause and must therefore be newly and correctly recorded.

In a particularly preferred embodiment of the invention, the reception channel means of the answering device is connected at its input to the microphone of the station circuit and the reproduction channel means is connected at its input side to the receiver of the station circuit. This embodiment has the advantage that all of the devices which are required for operation of the answering device are contained in the telephone apparatus. Since the first store means transmits the message through the receiver of the telephone apparatus for audible monitoring or audible reproduction of the message, and receives it through the microphone of the telephone apparatus, the use of an additional loudspeaker or microphone in the housing of the telephone apparatus, or as an additional auxiliary apparatus, is avoided. The space requirement is thereby considerably reduced, the operability is simplified and the clarity of the operating elements is increased.

The "reception/reproduction" operational condition can preferably only be produced when the mode selector key is switched to the "reception/reproduction" operational condition and simultaneously a monostable timing circuit is set by a further selector key and, in addition, during the set period of the monostable timing circuit the handpiece is raised from the telephone apparatus. By this control of a particular operational condition, the inadvertent switching on of, in particular, the reception condition is safely prevented, so that even on incorrect operation a release of the message sections is prevented with great certainty.

For selection of the reception or reproduction operational condition, there is furthermore preferably provided a separate selector key. The circuit arrangement may be such that a first actuation of the selector key indicates the reception condition and only a further actuation of this selector key initiates the synchronous addressing of the above mentioned storage zone of the first store means.

BRIEF DESCRIPTION OF THE DRAWINGS

The invention will be more readily understood from the following description of a preferred embodiment thereof given, by way of example, with reference to the accompanying drawings, in which.

DESCRIPTION OF PREFERRED EMBODIMENTS

Figure 1:
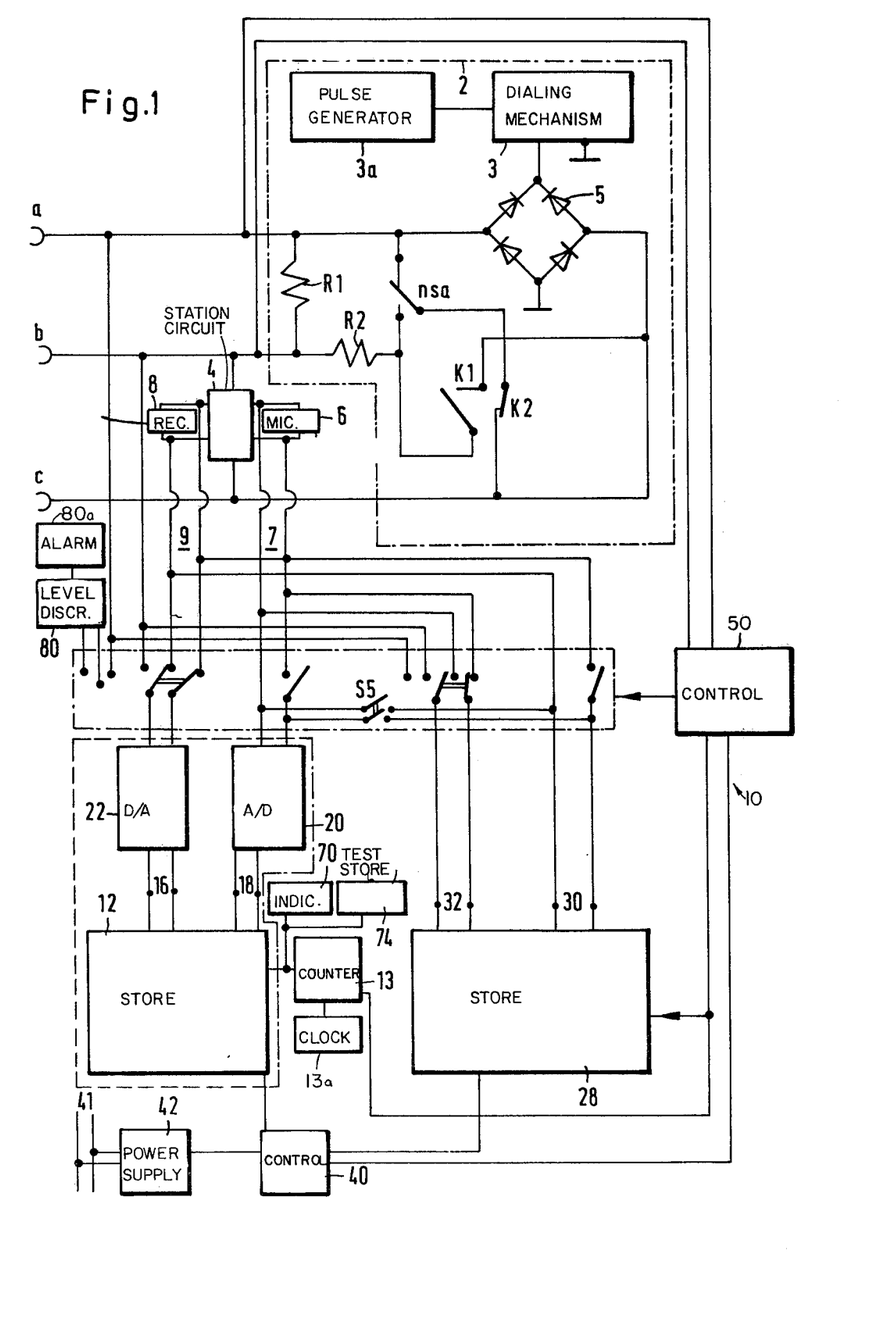
FIG. 1 shows a block diagram of a telephone apparatus embodying the present invention.

FIG. 1 diagrammatically illustrates a telephone apparatus embodying the invention and having an answering device integrally contained in a telephone housing. The telephone apparatus includes conventional components 2 to 8 for the telephone operation, including a dialing device 2, which comprises for example a pushbutton dialing mechanism 3 controlled by an electronic pulse generator 3a. The pushbutton dialing mechanism 3 is connected across telephone wires a, b through a rectifier bridge 5 when, during dialing, a contact K1 is closed and a contact K2 is opened. Between the wires a and b, during the speech condition, there is connected a station circuit 4, with the microphone 6 and the earpiece or receiver 8, since, during the speech condition, a short circuit is connected from the wire a through a contact nsa and contact K2, and the connection through the rectifier bridge 5 between the wires a, b is interrupted by opening of the contact K1. The resistors R1 and R2 are provided as overload protection.

A control circuit 50 is connected to the wires a, b and, on reception of a call, closes the exchange loop. The control circuit 50 can be set into various states of adjustment by the subscriber by actuation of easily accessible operating elements or pushbuttons on the surface of the telephone housing. In a first state, the control circuit 50 connects an output 16 of a first store 12 to the wires a, b and, after reception of a call, transmits a message stored in the first store 12 to the wires a, b. In a second state, selectable by the subscriber, the control circuit 50 connects the input 18 of the first store 12 to the microphone 6 of the station circuit 4 and sets the first store 12 into a condition ready for reception of a message. In a third state, the control circuit 50 connects the output 16 of the first store 12 to the receiver 8 of the station circuit 4 for reproduction (playback) of the message. In a rest state, which is likewise presettable by the subscriber, the control circuit 50 disconnects the output 16 and the input 18 of the first store 12 from the telephone operating circuit 2 to 8. In this rest condition, the telephone circuit is available without restriction for telephone operation and allows trouble free speech and dialing and also the automatic answering operation, if the subscriber has previously set a "call ready" operational condition.

The first store 12 comprises a solid state store having its input 18 connected to an analog-to-digital converter 20 and its output connected to a digital-to-analog converter 22. The analog-to-digital converter comprises a Delta modulator for converting the analog speech signals into digital speech signals, which are then stored in the first store. With a Delta modulation system, which processes only the alteration of a detected amplitude value relative to the preceding amplitude value as information, the data rate required for producing good speech quality can be reduced to under 12,000 bits per second. For restoring the analog speech signals from the contents of the first store 12, the digital-to-analog converter 22 comprises a Delta demodulator which restores the digital speech signals to analog speech signals.

For recordal of a received message which the caller wishes to give to the called subscriber, there is provided a second store 28, which is a magnetic tape store. In its first state, after transmitting a first section of the message, the so-called "introduction", the control circuit 50 disconnects the first store 12 from the wires a, b and then connects the second store 28 to the wires a, b and sets the second store 28 to a reception state. After a predetermined reception period, the control circuit 50 connects the first store 12 once more to the wires and transmits thereto a further message section, a so-called "conclusion." Finally, the exchange loop is interrupted.

The control circuit 50 connects the output 30 of the second store 28, in a fourth state which is selectable by the subscriber, to the receiver 8, which together with the microphone 6 is arranged in the handset of the telephone apparatus. In this fourth state, the control circuit permits the reproduction through the receiver 8 of the received message stored in the magnetic tape store. In a fifth state, the control circuit 50 connects the input 32 of the magnetic tape store 28 to the microphone 6 and puts the magnetic tape store 28 in a reception state. In this fifth state, a text can be dictated by the telephone subscriber into the magnetic tape store, and the apparatus then operates in a dictation mode. In the fourth adjustment of the control circuit 50, in which the output 30 of the magnetic tape store 28 is connected to the receiver 8, the text dictated by the subscriber through the microphone 6 into the store 28 can be heard again.

In the housing of the telephone apparatus, in the present embodiment of the answering device, there is provided a drive mechanism (not shown) which can be controlled by the control device 50 and which comprises shafts which project from the housing of the telephone apparatus for engaging and driving tape spools containing the magnetic tape. Preferably, a mini-cassette of known type is employed, which comprises tape spools for receiving the magnetic tape and which can be removably mounted on the shafts of the drive mechanism.

The satisfactory functioning of the telephone operation has absolute priority. The handling of outgoing and incoming telephone connections should not be hindered by the stores 12, 28 and the control circuit 50. For this purpose, the control circuit 50, on reception of a call, automatically switches itself from any of the second to fifth states into the rest state, whereby the telephone operating circuit 2 to 8 is disconnected from the stores 12, 28. By an acoustic or optical warning, the subscriber is informed of the reception of a cell and the incoming call is connected to the station circuit 4.

The answering device is powered by a power supply 42, which is provided with an alternating voltage at its input by a supply network 41.

The first store 12 is a transient solid state store and comprises e.g. dynamic fixed value stores, RAMs, the store content of which, i.e. the digital message, is periodically restored in order to be constantly available. In case of a power supply failure, the periodic restoration of the first store is interrupted and the stored content is therefore lost.

To counteract this, the control circuit 50 in the second state, in which the first store 12 is connected to the microphone 6, also simultaneously connects the magnetic tape store 28 to the microphone 6 and simultaneously sets the first store 12 and the magnetic tape store 28 to reception operation, the magnetic tape of the magnetic tape store 28 previously being transported into a predetermined position. The message, as it is stored in the first store, is simultaneously recorded in the magnetic tape store.

A power failure control device 40 is connected to the power supply 42 and, upon restoration of the power supply after a power failure, transfers the message from the magnetic tape store 28 to the first store 12. For this purpose, a direct connection is provided between the output 30 of the magnetic tape store 28 and the input 18 of the first store 12 which, after restoration of the power supply, is closed by a switch S5 as soon as the magnetic tape of the magnetic tape store 28 has been transported into the position in which the message can be read from the magnetic tape.

Figure 2A:
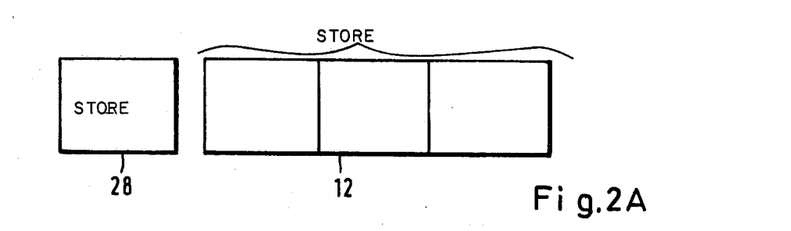
FIGS. 2A and 2B show diagrammatic illustrations of different zones of a first store.
Figure 2B:
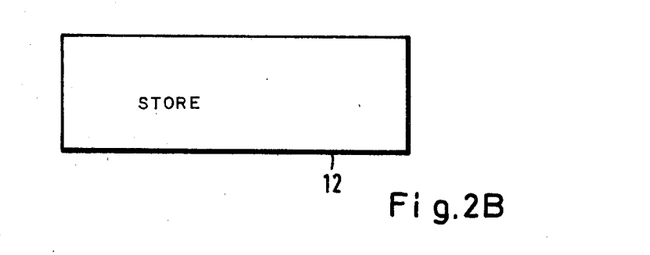

As is evident, in particular from FIGS. 2A and 2B, the first store comprises a plurality of store zones, which are individually and directly addressable, for recordal and reproduction of message sections, through a reception channel comprising microphone 6 and wires 7 and a reproduction channel comprising receiver 8 and wires 9. The addressing of the store locations of the individual zones of the first store is effected serially and synchronously by means of a counter 13 provided with constant timing pulses from a clock 13a.

As is evident from FIGS. 2A and 2B which show the schematic distribution of the store locations in the store zones, the first store 12 is selectively operated either with an introduction zone for storage of an introduction message, a concluding message zone for storing a concluding message and a response zone for storing a response (FIG. 2A) or merely with one message zone (FIG. 2B). Operation with one message zone occurs when the second store 28 is not provided and the apparatus operates as an answering device without incoming speech recordal. If, on the other hand, the second store is provided and is operational, then the first store 12 is operated with an introduction zone, a concluding message zone and a response zone (FIG. 2A). The answering device firstly introduces itself, when a call is received, by the introduction message, i.e. the control circuit 50, following the received call, connects the first store 12 to the telephone wires a, b. The second store 28 is then connected to the wires a, b and the message from the caller is received. Subsequently, the first store 12 is connected to the wires a, b and the concluding message is transmitted to the caller. Next, the exchange loop is opened and the call is terminated. If it is found by a test before reception of a call that the second store 28 is not operational because of a fault, then, instead of the second store, the response message is fed to the wires a, b between the introduction and the concluding message. Since the counter 13 directly addresses the selected store zone of the first store 12 and reads in or out the store content, the operability is substantially simplified. Searching for the beginning of the relevant store zone, which was previously unavoidable with magnetic tape stores, is avoided.

The control circuit 50 is programmed so that each reception over the reception channel 6, 7 in any selected zone of the first store 12 is directly followed by a reproduction (playback) over the reproduction channel 8, 9 in order to monitor acoustically, with respect to completeness and clearness, the message section previously dictated into the machine. Due to this automatically occurring procedure, and because of the direct addressability of the individual zones of the solid state store 12, the laborious rewinding etc. which was previously necessary is no longer required.

In the housing there is provided an optical indicator device 70 comprising an array 94 (FIG. 4) of discrete indicator elements 96 disposed in a row, which can be controlled and illuminated by means of an indicator control 92 in synchronism with the addressing of the store locations of the first store. The number of the already illuminated elements, relative to the total number of indicator elements, is proportional to the addressed portion of the relevant store zones relative to the total content of the relevant store zones. In this way, the period of time over which the first store 12 has been addressed is optically indicated to the user. On recordal of a message section, therefore, the user can adapt the length of the message section and his speed of speech to the total capacity of the relevant store zone or to the unoccupied part of the relevant store zone.

Figure 3:
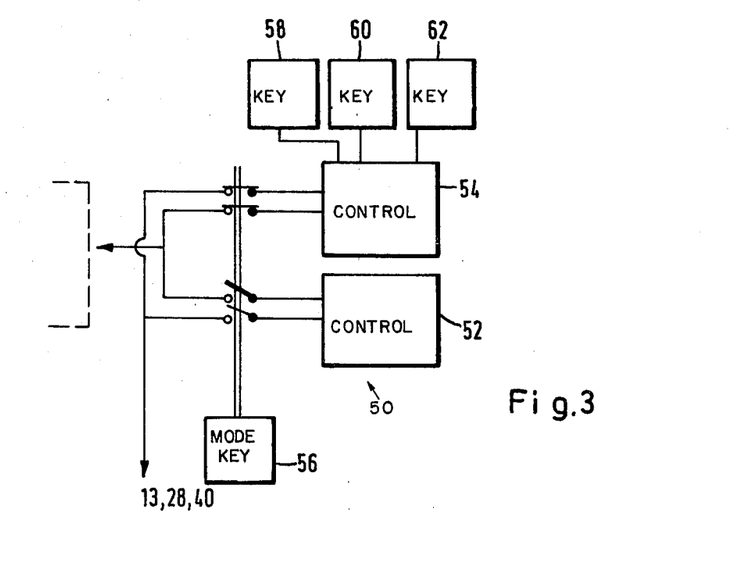
FIG. 3 shows a block diagram of a control circuit.

FIG. 3 shows the components of the control circuit 50. The control circuit 50 contains a first control unit 52 for controlling the operation during the "call ready" condition. The control circuit 50 also contains a second control unit 54 for controlling the operation during the "reception/reproduction" operational condition. A mode selector key 56 allows one or the other operational condition to be set and causes the control circuit 50 to effect control through either the first or the second control unit 52, 54.

The first control unit assumes control of the operational sequence when the mode selector key is set to the "call ready" position. At the beginning of the program of the first control unit 52, all zones of the first store 12 are automatically addressed and the contents thereof applied as electrical speech signals at the output of the digital-to-analog converter 22, which is at the output side, to a level discriminator 80 which monitors the electrical speech signals of the message sections to determine whether they fall below a predetermined minimum level for longer than a predetermined interval. If not, the program then checks the first control unit 52 and then the reception readiness of the second store 28. For this purpose, the unwound tape of the second store 28 is driven for a short period and call readiness is signalled to the user when the coiled tape spool rotates under the tension of the magnetic tape, since in that case (a) a magnetic tape is present, i.e. a cassette has been inserted into the second store 28, and (b) the magnetic tape has no break. The telephone apparatus, together with the integral answering device 10, is then ready to receive a call and the first control unit 52, on the reception of a call, effects the connection and disconnection of the first and second stores 12, 28 to the wires a, b in the correct sequence.

If, on the other hand, the level discriminator 80 ascertains that the electrical speech signals have fallen too far or too long below the minimum level, or if a tape breakage or the like is detected, then an alarm 80a is operated.

The second control unit 54 controls the operational sequence when the mode selector key 56 has been set to the "reception/reproduction" position. The second control unit 54 can be operated through selector keys 58, 60, 62 by the user, whereby corresponding program sections of the control program of the second control unit 54 are selected and put into operation. A first selector key 58 serves to select the store zone of the first store 12. A second selector key 60 effects the selection of the "reception" or "reproduction" operational condition. A third selector key 62 is a safety key which must be actuated in order to activate the second control unit 54. By means of the third selector key 62, a monostable timing device is initiated and during the time period of this device the handset 6, 8 must be removed from the telephone apparatus in order to activate the second control unit 54 and to make the "reception/reproduction" operational condition functionally ready. The third selector key 62 thus serves as a protection against inadvertent initiation of the "reception/reproduction" operational condition.

Furthermore, the telephone apparatus has separate selector keys for controlling the second store 28.

As shown in FIG. 1, a test store 74 is connected to the output of the counter 13 addressing the first store 12, which test store 74 contains store elements associated with the individual zones of the first store 12, and which store elements change to a set state after the associated store zones of the first store 12 are completely addressed during a reception procedure. Furthermore, there is provided a test key (not shown) which, on actuation, optically indicates the state of the store elements of the test store and thereby informs the user whether the store zones of the first store 12 have all passed through a complete cycle during the reception procedure, i.e. whether the corresponding message sections are all present. The state of the store elements of the test store 74 can be suitably optically indicated, on actuation of the test key, by illumination or non-illumination of selected photodiodes of the indicator device 70. In this way, separate indicator elements can be avoided, and thus the convenience of the selector and control keys in the housing is increased.

According to a different embodiment of the invention, between the output of the analog-to-digital converter 20 and the input 18 of the first store 12 there is inserted a discriminator circuit (not shown), which detects the presence or absence of a digital speech signal. When there is no digital speech signal at the output of the analog-to-digital converter 20, the control circuit 50, through the discriminator circuit (not shown), sets the first store 12 into a ready or stand-by condition, in which no recordal in the first store 12 is effected. If, on the other hand, a digital speech signal is detected by the discriminator circuit at the output of the analog-to-digital converter 20, then the first store 12 is put by the control circuit 50 into an active state and serially addressed, and succeeding data words of the incoming digital speech signal are successively stored in the addressed store zones.

Preferably, a delay circuit (not shown) is inserted directly before the input of the first store 12, which delay circuit delays the digital speech signal through at least the response period or detection period of the discriminator circuit. It is thus ensured that the digital speech signal first reaches the first store 12 when the first store 12 is again activated and ready for storage. In this way, the storage locations of the first store 12 have data fed into them only when a speech signal is present but not during the occurrence of a speech pause. Optimum utilization of the store capacity is thus achieved.

Figure 4:
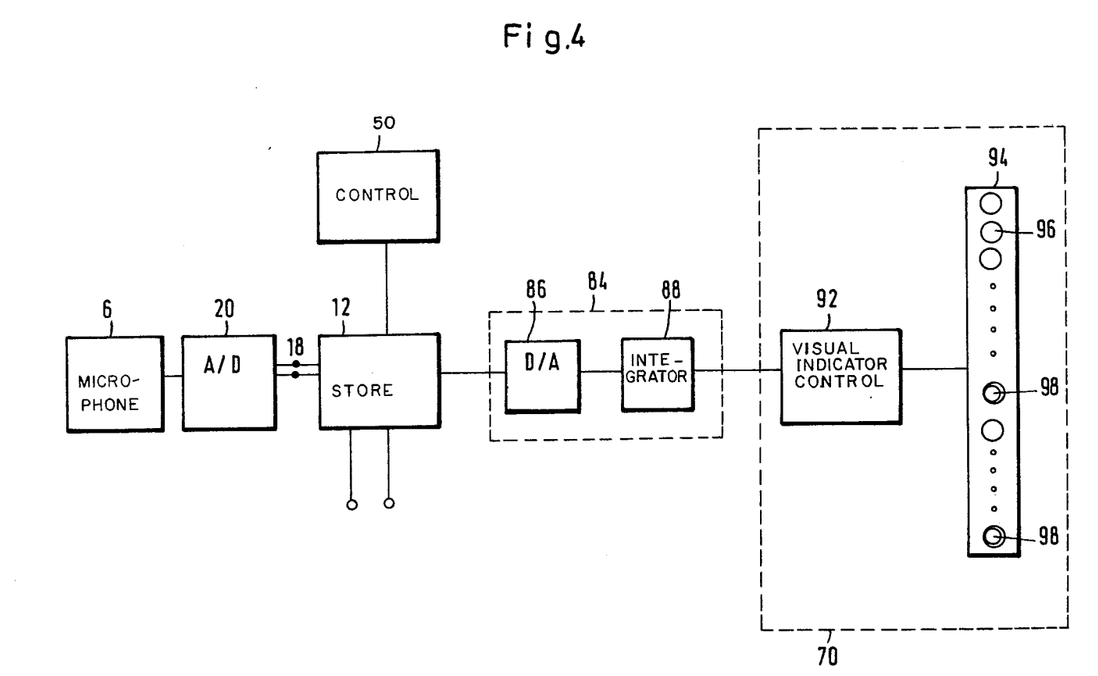
FIG. 4 shows a block diagram of an optical indicator device in detail.

FIG. 4 shows a block diagram of the optical indicator device 70. The first store 12 is so controlled by the central control circuit 50 that the output of the first store 12, when the answering device is suitably adjusted by the user, and on incoming of a call, is connected to the telephone conductors and then transmits the message to the caller. The input of the first store 12 is connected through analog-to-digital converter 20 to the microphone 6, the analog-to-digital converter 20 converting the electrical speech signal received from the microphone 6 into a digital signal for storage in the first store.

The first store 12 is also connected to a control unit 84, the input of which contains a digital-to-analog converter 86, to which an integrator 88 is connected. The digital-to-analog converter 86 receives the time pulses from the timing pulse oscillator of the first store 12, which is constructed as a solid state store, and converts them into an analog signal which the integrator 88 converts to a staircase voltage, which is eventually smoothed at the output of the integrator by a smoothing circuit and periodically proportionally increases. The staircase voltage is applied to the indicator device 70 which at its input has a visual indicator control 92 which at each constant, predetermined increase of the staircase voltage illuminates an additional further indicator element (photo diode) 96 of an array 94, which element is adjacent the previously already illuminated indicator element 96. The number of illuminated elements 96 then corresponds to the occupation level of the first store 12.

The time interval between illumination of two adjacent photodiodes 96 is a predetermined fraction, one half of a second. Each nth photodiode 96 has an additional marking 98. On illumination of a photodiode with this additional marking, which may for example comprise an increased light intensity of the photodiode, the user is informed of the expiry of a full second.

We claim:
1. Telephone apparatus comprising:
   a housing provided with a dialing device and a station circuit;
   a handset provided with a microphone and a receiver associated with the station circuit; and
   an answering device integrally arranged in the housing;
   the answering device comprising:
   a solid state store for storing a message, the solid state store having an input connected to an analog-to-digital converter for converting analog speech signals to digital speech signals and an output connected to a digital-to-analog converter for reconverting the digital speech signals to analog speech signals;
   control circuit means for selection and control of the operational state and the operational sequence of the answering device;
   pushbutton means on the housing for programming the control circuit means;
   reception channel means for connecting the solid state store to the handset microphone for receiving the message; and
   reproduction channel means for connecting the solid state store to the handset receiver for reproducing the message.

2. Telephone apparatus as claimed in claim 1, wherein the solid state store is divided into a plurality of store zones which are directly addressable by the channel means for recordal and transmission of message sections.

3. Telephone apparatus as claimed in claim 1 or 2, wherein the solid state store is selectively operable with three different message zones or a single message zone.

4. Telephone apparatus as claimed in claim 1, further comprising counter means for serially and synchronously addressing a plurality of store locations in the solid state store and means for supplying timing pulses to the counter means.

5. Telephone apparatus as claimed in claim 1, wherein the control circuit means includes means for reproducing the message immediately after recordal thereof.

6. Telephone apparatus as claimed in claim 1, further comprising optical indicator means responsive to reception or reproduction of the message for indicating the portion of a respective zone of the solid state store which is addressed by the reception of reproduction.

7. Telephone apparatus as claimed in claim 6, wherein the indicator means comprises a plurality of discrete indicator elements and means for operating the indicator elements in synchronism with the operation of the solid state store.

8. Telephone apparatus as claimed in claim 7, wherein the indicator elements comprise photodiodes and the operating means comprises means for energizing the photodiodes in synchronism with the addressing of the solid state store.

9. Telephone apparatus as claimed in claim 1, further comprising second store means for recording an incoming message, the control circuit means including means for sequentially operating the solid state and second store means and reproducing the recorded incoming message from the second store means.

10. Telephone apparatus as claimed in claim 9, wherein the second store means comprises a magnetic tape store, the solid state store comprises a transient solid state store, means are provided for recording the message in the second store means and means responsive to a power failure are provided for transferring the recorded message from the second store means to the solid state store.

11. Telephone apparatus as claimed in claim 1, wherein the control circuit means comprises first and second control means for controlling the operation of the answering device while the latter is in a first "call ready" operational condition and a second "reception/reproduction" operational condition, respectively, and mode selector means for selectively enabling either of the first and second control means and thereby selecting the "call ready" or "reception/reproduction" operational condition.

12. Telephone apparatus as claimed in claim 11, wherein the first control means comprises means responsive to selection of the "call ready" operational condition for addressing the solid state store to provide an output signal corresponding to the message and level discriminator means for receiving the output signal and initiating an alarm signal if the output signal falls below a predetermined level for a predetermined time.

13. Telephone apparatus as claimed in claim 12, further comprising second store means for storing an incoming message and means for monitoring the reception readiness of the second store means following passage of the output signal through the level discriminator means.

14. Telephone apparatus as claimed in claim 13, wherein the second store means comprises a magnetic tape store including a magnetic tape and the monitoring means comprises means for switching test driving of the magnetic tape store and means for detecting a breakage in the magnetic tape.

15. Telephone apparatus as claimed in claim 14, including means for recording a marking signal on the tape during the test driving of the tape.

16. Telephone apparatus as claimed in claim 11, wherein the first and second control means comprise a microprocessor and the mode selector means is operable to select sections of a program in the microprocessor.

17. Telephone apparatus as claimed in claim 11, further comprising monostable timing means responsive to operation of the mode selector means for initiating a timing cycle and means responsive to operation of the timing means and to removal of the handset from the housing for enabling the "reception/reproduction" operational condition only if the handset removal occurs during the timing cycle.

18. Telephone apparatus as claimed in claim 1, further comprising counter means for addressing the solid state store and a test store connected to the output of the counter means, the test store comprising store elements associated with respective zones of the solid state store and adapted to change to a set condition in response to full addressing of the zones and manually actuatable indicator means for indicating the condition of the test store elements.

19. Telephone apparatus as claimed in claim 18, wherein the indicator means comprises photodiodes.

* * * * *

UNITED STATES PATENT AND TRADEMARK OFFICE
CERTIFICATE OF CORRECTION

PATENT NO. : 4,359,607
DATED : November 16, 1982
INVENTOR(S) : Hubert Hannig et al It is certified that error appears in the above—identified patent and that said Letters Patent is hereby corrected as shown below:

Column 7, line 55, "cell" should be --call--.

Column 9, line 63, "seconc" should be --second--.

Column 12, line 13, "of" should be --or--.

Signed and Sealed this

Eighth Day of February 1983

[SEAL]

Attest:

GERALD J. MOSSINGHOFF

Attesting Officer      Commissioner of Patents and Trademarks